United States Patent [19]
Demski et al.

[11] Patent Number: 5,584,493
[45] Date of Patent: Dec. 17, 1996

[54] FOLDING STEP SYSTEM FOR VEHICLES

[75] Inventors: Richard F. Demski; Alan M. Iversen, both of Appleton; Kevin J. Quinn, Hortonville; Kenneth V. Kamprath, Menasha; Timothy C. Willett, Fond du Lac; J. Roger Lackore, Jr., Appleton; Daniel E. Friebel, Combined Locks; Russ Litscher, Kimberly, all of Wis.

[73] Assignee: Pierce Manufacturing Inc., Appleton, Wis.

[21] Appl. No.: 383,271

[22] Filed: Feb. 3, 1995

[51] Int. Cl.⁶ .................................................. B60R 3/02
[52] U.S. Cl. ........................... 280/166; 280/169; 105/445
[58] Field of Search ........................... 280/163, 164.1, 280/164.2, 166, 169; 105/444, 445, 446, 447, 448, 449, 450; 180/53.8; 296/61, 62; 49/356; 414/921

[56] References Cited

U.S. PATENT DOCUMENTS

| | | | |
|---|---|---|---|
| 1,149,934 | 8/1915 | Maynard | 105/445 |
| 1,198,357 | 9/1916 | Kirkley | 280/166 |
| 2,095,833 | 10/1937 | Rockwell | 180/53.8 |
| 3,561,786 | 2/1971 | Lentz | 280/166 |
| 3,572,753 | 3/1971 | Claassen | 280/166 |
| 3,671,058 | 6/1972 | Kent | 280/166 |
| 3,751,068 | 8/1973 | Green | 280/166 |
| 3,762,742 | 10/1973 | Bucklen | 280/166 |
| 3,784,227 | 1/1974 | Rogge | 280/166 |
| 3,833,240 | 9/1974 | Weiler | 280/166 |
| 3,997,211 | 12/1976 | Graves | 296/162 |
| 4,131,209 | 12/1978 | Manning | 214/85 |
| 4,175,495 | 11/1979 | Kleim | 105/450 |
| 4,185,849 | 1/1980 | Jaeger | 280/166 |
| 4,200,303 | 4/1980 | Kelly | 280/166 |
| 4,231,583 | 11/1980 | Learn | 280/166 |
| 4,424,751 | 1/1984 | Blochlinger | 105/447 |
| 4,551,056 | 11/1985 | Risner | 414/921 |
| 4,570,962 | 2/1986 | Chavira | 280/166 |
| 4,685,858 | 8/1987 | Manning et al. | 414/537 |
| 4,708,355 | 11/1987 | Tiede | 280/166 |
| 4,720,116 | 1/1988 | Williams et al. | 280/166 |
| 4,759,682 | 7/1988 | Hood | 414/537 |
| 4,827,548 | 5/1989 | Hood | 14/71.1 |
| 5,137,294 | 8/1992 | Martin | 280/166 |
| 5,224,723 | 7/1993 | Hatas | 280/166 |

FOREIGN PATENT DOCUMENTS

| | | | |
|---|---|---|---|
| 0447372 | 9/1991 | European Pat. Off. | 280/166 |

Primary Examiner—Richard M. Camby
Assistant Examiner—Frank Vanaman
Attorney, Agent, or Firm—Wheeler Kromholz & Manion

[57] ABSTRACT

A pivotable fold-down step system mounted to a vehicle, such as a fire truck or rescue truck, and synchronized to extend and retract by vehicle door motion. The step system is designed to easily achieve ingress and egress requirements stated within the National Fire Protection Agency (NFPA) guidelines. The step remains sealed and contoured to the vehicle profile when in the upright stowed position when the vehicle door is closed. The fold down step is operated by means of a pressurized fluid system which is integral to the vehicle. As the vehicle door opens the step is extended downward, under pressurized control, to allow for rapid and safe egress from the vehicle. As the vehicle door closes, the step is again operated by the pressurized integral fluid system and the step rises and folds into a stowed position within the vehicle body prior to transport of the vehicle.

9 Claims, 6 Drawing Sheets

FOLDING STEP SYSTEM FOR VEHICLES

BACKGROUND OF THE INVENTION

The present invention generally relates to a concealed, automatic extending and retracting step specifically for, but not limited to, fire and rescue emergency vehicles. The invention allows for a lower step height with shorter vertical spacing between steps providing a much safer and more comfortable ingress and egress from the vehicle. Typically the step design on custom fire fighting and rescue apparatus comprises an integral stepwell which is a non-moving part of the vehicle cab structure normally concealed behind the vehicle door. Not only does the typical step design eliminate floor space within the vehicle cab, the typical step design also has a high vertical step-up due to vehicle ground clearance requirements necessary for vehicle angle of approach. For safety reasons, the National Fire Protection Agency (NFPA) recommends a maximum 24 inch (61 cm) step height for ease of ingress and egress. Thus, it is difficult for many fire fighters in full turnout gear to get in and out of the vehicles designed with the typical step.

It is an object of the present invention to remedy the shortcomings of the typical step design by providing a folding step system which extends from and retracts into the vehicle. It is a further object to provide such a system which is easily attachable to the chassis of the vehicle. It is yet a further object of the invention to provide such a system which has fully or substantially automatic operation.

Other types of foldout steps are known in the fire and rescue vehicle industry. See for example U.S. Pat. No. 3,833,240 (Weiler). These units are typically added on to the vehicle directly below the door at the base of the typical step design and have a means to extend downward. These units are also common in the recreational vehicle industry. They do not replace the typical step design but are added to vehicles having the design to reduce the high vertical step-up. The units have many shortcomings including the fact that they are exposed to environmental elements. The new design directly replaces the typical design and eliminates the need for the add-on style step.

Finally, the present invention is housed within, not beneath the vehicle body and chassis. This substantially prevents the present invention from being exposed to environmental elements, e.g., water, salt, etc., when folded away in the stowed position.

Definition of Terms

For the purpose of clarity, the terms given below shall be interpreted throughout the specification and the claims as having the following definitions. Should there be any contradiction between the meaning given a term herein and its common meaning, that term shall be interpreted as having both meanings.
Fluid—any compressible, substantially compressible, or non-compressible gas, liquid, mixture of gases, mixtures of liquids, or mixture of gases and liquids.
Air—a fluid.

SUMMARY OF THE INVENTION

The invention comprises a folding step system for use with a vehicle, preferable a fire truck or rescue truck. The system comprises a step structure which unfolds or actuates from the side of the vehicle just below the vehicle door. The step structure is mounted within a step box which is rigidly attached to the vehicle frame and chassis. In its folded position, the step structure fits completely within the step box. The step structure pivots into and out of the step box on an axle which passes through the step structure and whose ends are rotatably mounted to and supported by the step box.

The step assembly or structure unfolds or is actuated by means of a fluid filled reciprocating or double acting cylinder. The cylinder is preferably a pneumatic air cylinder although any kind of fluid, including hydraulic fluid, could be used. Furthermore, the double acting cylinder could be replaced by a single acting cylinder and a spring whereby the cylinder would actuate the step into its unfolded position and the spring would return the step to its folded position.

The preferred pneumatic cylinder is connected by air lines to a pneumatic control valve. The control valve has a hinged paddle which contacts a spring biased control valve pin which is biased into a first valve position. In the first valve position, pressurized air is provided to one end of the pneumatic cylinder to extend the cylinder ram and thus extend the folding step to its down position. A door plunger is mounted within the vehicle door frame. The plunger has two ends; the first contacts the door and the second contacts the paddle. As the door is closed, the door panel or frame comes into contact with the end of the plunger. As the plunger is pushed through the door frame, its opposite end presses against the paddle. When the paddle is depressed, the control valve pin closes a control valve port that provides fluid to extend the cylinder ram and opens a second control valve port which in turn provides fluid to retract the cylinder ram. Thus, when the vehicle door is closed the step structure retracts or folds up into the step box.

Within the step box, a plurality of step stops are provided for limiting the movement of the step structure. The upper step stop halts the step structure once it has reached its completely folded position. The lower step stops halt the step structure and provide support for the step structure when it has been extended or folded down. While the drawings show that the step structure has 2 (two) steps, it is to be understood that only one or a plurality of steps could be included on the step structure without deviating from our invention as described.

The system further includes a controlled fluid supply for supplying fluid, typically compressed air, to the control valve. In a vehicle such as a fire truck or rescue truck, the primary air supply can be from the vehicle's air system. A separate and auxiliary air supply can also be provided as an air source to actuate the folding step structure. The preferred air supply system includes an auxiliary compressor, an air regulator, a tank, and an air supply line from the air brake system. In the event that the vehicle air system pressure is depleted, the auxiliary air compressor is designed to provide enough air for multiple cycling of the folding step structure.

The step system provides for a lower step height with shorter vertical spacing between steps providing a much safer and more comfortable ingress and egress from the vehicle. The steps attached to the step structure are self-draining to prevent the formation of ice on the step surface in colder climates. The step structure remains sealed and contoured to the vehicle cab profile in the upright stowed position when the vehicle door is closed. As the vehicle door opens, the step structure unfolds or opens from the stowed position by means of the pressurized cylinder. The unfolded step structure allows for rapid and safe egress from the vehicle cab. As the vehicle door is closed, the step system is actuated and the step structure is retracted into its stowed position prior to transport of the vehicle. All step movements are performed rapidly so that the step structure is fully extended before the vehicle occupant finishes opening the door and steps onto the top step. Opening the vehicle door naturally forces the person to step away from the cab. The door sweep extends beyond the step extension. Step retraction is also performed rapidly so that the step structure will be fully folded into the vehicle body before the vehicle begins to move. This minimizes the chances of a partially extended step structure striking a foreign object when the vehicle begins to move.

Alternatively, our invention could be described as a process using a folding step system for a vehicle having a chassis and at least one door, the system including a step box mechanism attached to the vehicle chassis beneath the door, the step box mechanism having a generally open front and a pair of side walls; a bearing surface formed in each side wall; a step structure having at least one step and an axle, the step structure positioned within the step box and the axle rotatably supported by the bearing surface; a fluid filled reciprocating cylinder having a body and a ram structure, the body being connected to the step box and the ram structure connected to the step structure; a controlled fluid source for providing fluid to the reciprocating cylinder connected to the reciprocating cylinder, the process comprising: opening the vehicle door; actuating the controlled fluid source; extending the ram structure; and pivoting out the step structure.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 9:
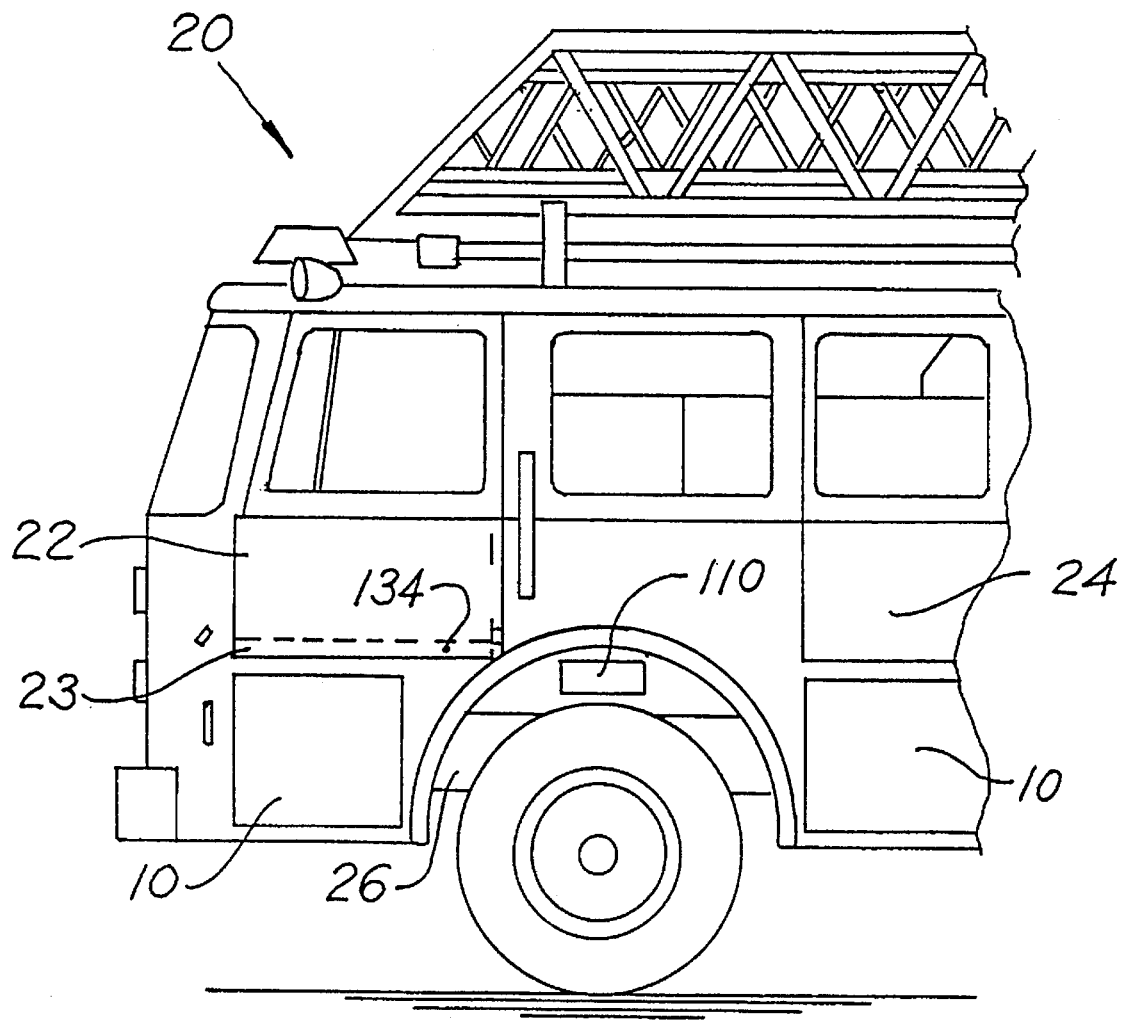
FIG. 9 is a side view of a fire truck having our folding step system attached thereto.

The present invention, shown at 10 in the drawings, comprises a folding step system for vehicles. Referring to FIG. 9, its application to a fire and rescue truck 20 can be seen. The step system 10 is mounted to the chassis 26 of the fire truck 20 just below the door 22. When the door 22 is opened, the system 10 activates the step structure 50 which is unfolded or extended from the chassis 26 outward and downward to provide a means for easy and convenient egress from or ingress to the vehicle 20. Also shown in FIG. 9, the system 10 can be utilized for a crew or back door 24 in addition to the front or cab door 22 of the vehicle 20.

The system 10 includes a step box 30, a step structure 50, a step axle 70, a fluid filled reciprocating cylinder 90, and a controlled fluid source 110. Please refer to FIGS. 1–4.

The step box 30 is shown in FIGS. 1, 2, 3, 4, 7, and 8 and comprises a box-like structure having a pair of step box sides 32 and a step box back 34. Its framework is a steel sheet metal weldment designed to protect the step structure 50 and the controlled fluid source 110 from normal environmental elements, e.g., those encountered in normal roading. Please note that the framework could be made from any sufficiently rigid material. The front and top of the step box 30 are generally open. A pair of flanges 36 are attached to the upper edges of the step box sides 32 as shown in the Figures. Each flange 36 has a plurality of openings 38 through which fasteners pass to connect the step box 30 to the chassis 26 of the vehicle or truck 20. A mounting block 40 is attached to one side wall 32 of the step box 30. End 98 of the fluid-filled reciprocating cylinder 90 is pivotally attached to mounting block 40. In addition, step box 30 further includes a pair of gussets 31 in step box sides 32. Gussets 31 provide additional strength and rigidity to the step box 30.

Figure 2:
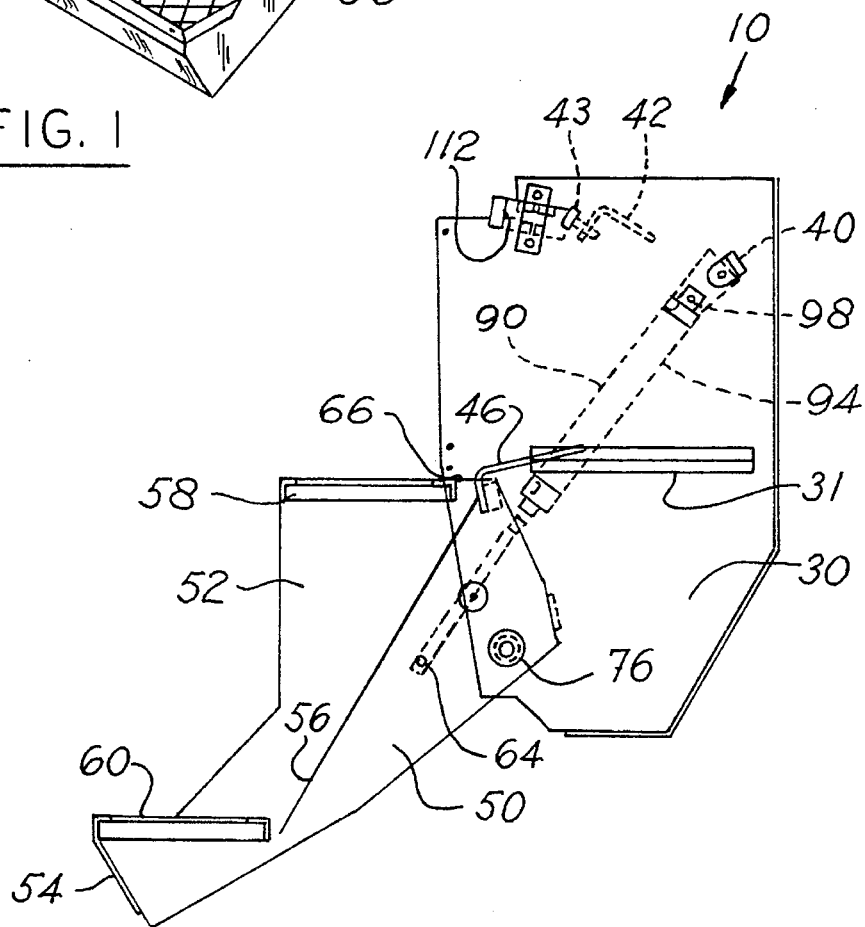
FIG. 2 is a side view of the folding step assembly.
Figure 4:
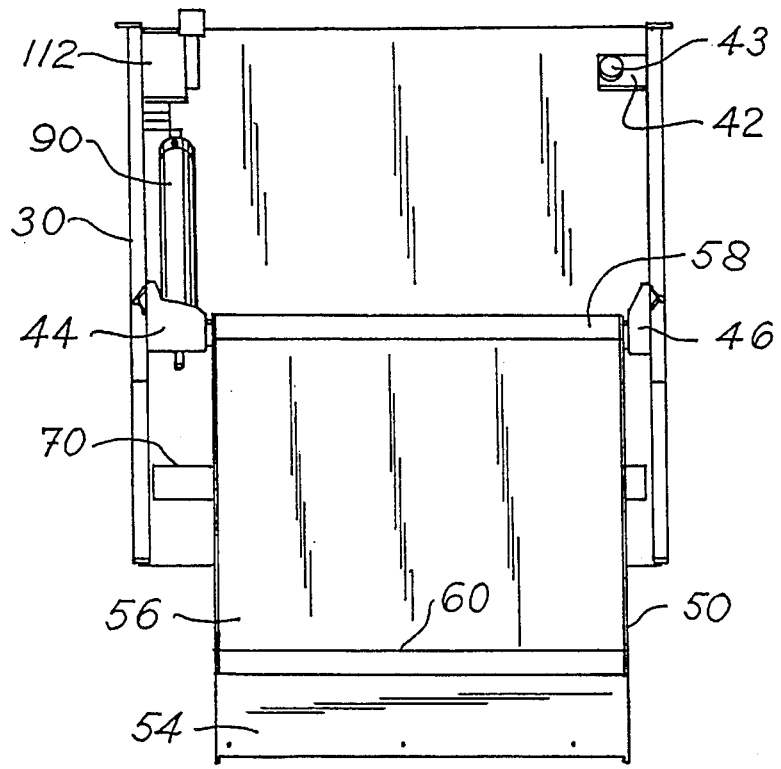
FIG. 4 is a front view of the folding step assembly.

A plurality of stops 43, 44, and 46 are also provided for stopping or limiting the motion of step structure 50 within step box 30. An upper step stop bracket 42 is attached to one step box side wall 32 (which is opposite the other side wall 32 to which the cylinder mounting block 40 is attached) just below its flange 36. Upper step stop bracket 42 is best shown in FIGS. 2 and 4. The bracket 42 has an adjustable stop 43. The lower most step 60 of step structure 50 comes into contact with adjustable stop 43 when the step structure 50 is in the upright stowed position.

Figure 8:
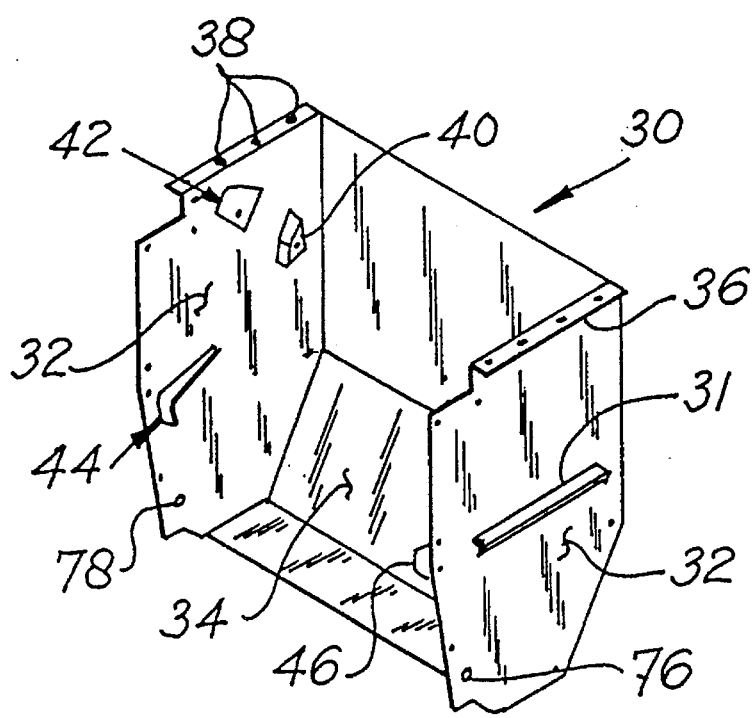
FIG. 8 is a top perspective view of the step box.

A first lower step stop bracket 46 is provided below upper step stop bracket 42. First lower step stop bracket 46 is shown in FIGS. 2, 4, and 8. Bracket 46 is generally "L" shaped. A second lower stop bracket 44 is attached to the opposite step box side 32 as shown in FIGS. 1, 4, and 8.

Figure 1:
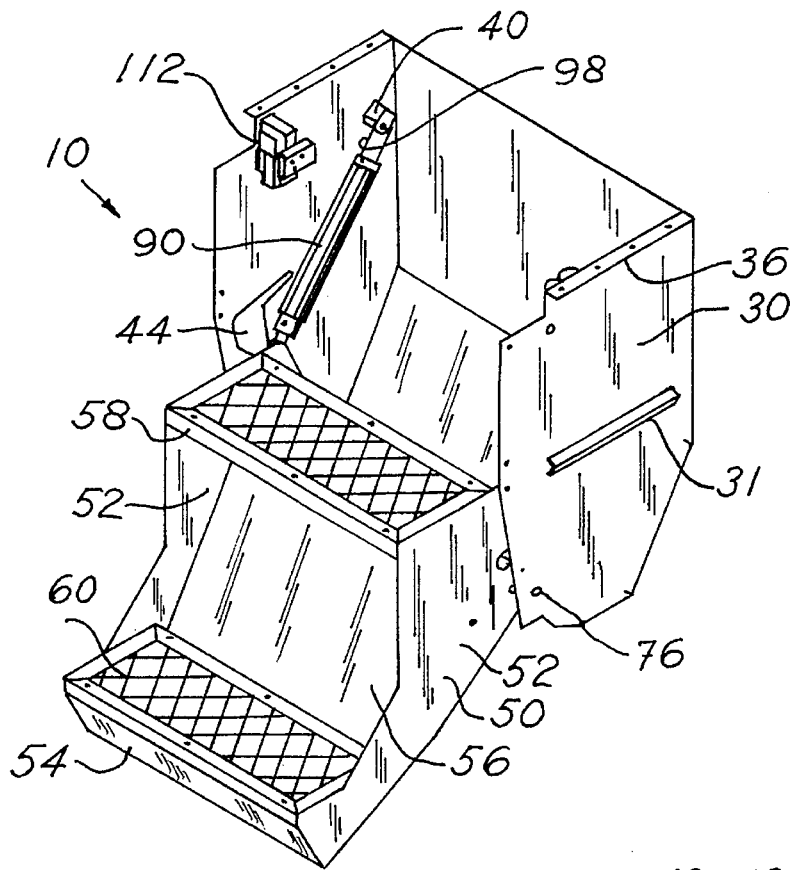
FIG. 1 is a top perspective view of the folding step assembly.
Figure 3:
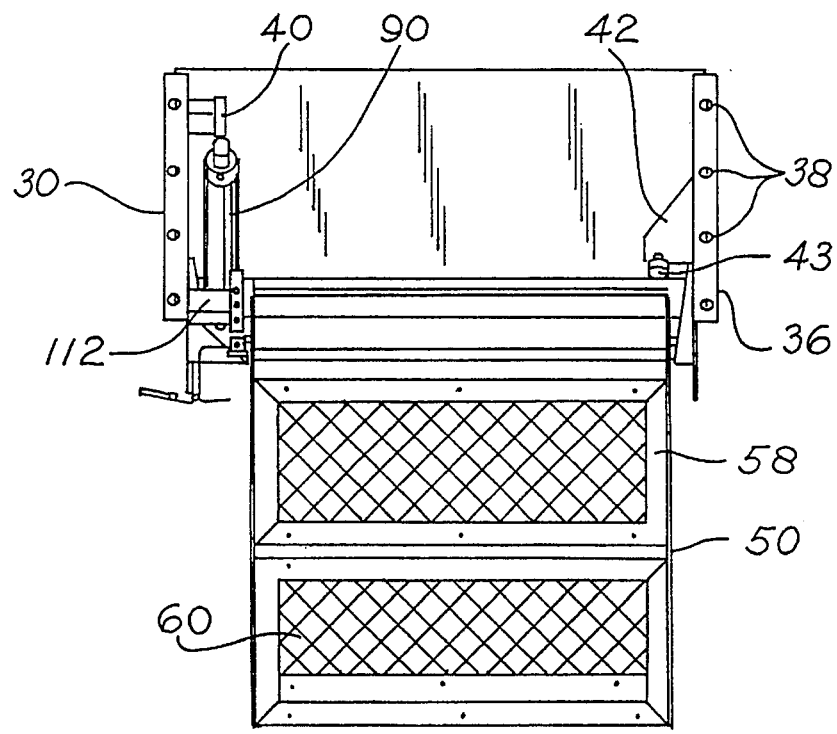
FIG. 3 is a top plan view of the folding step assembly.
Figure 5:
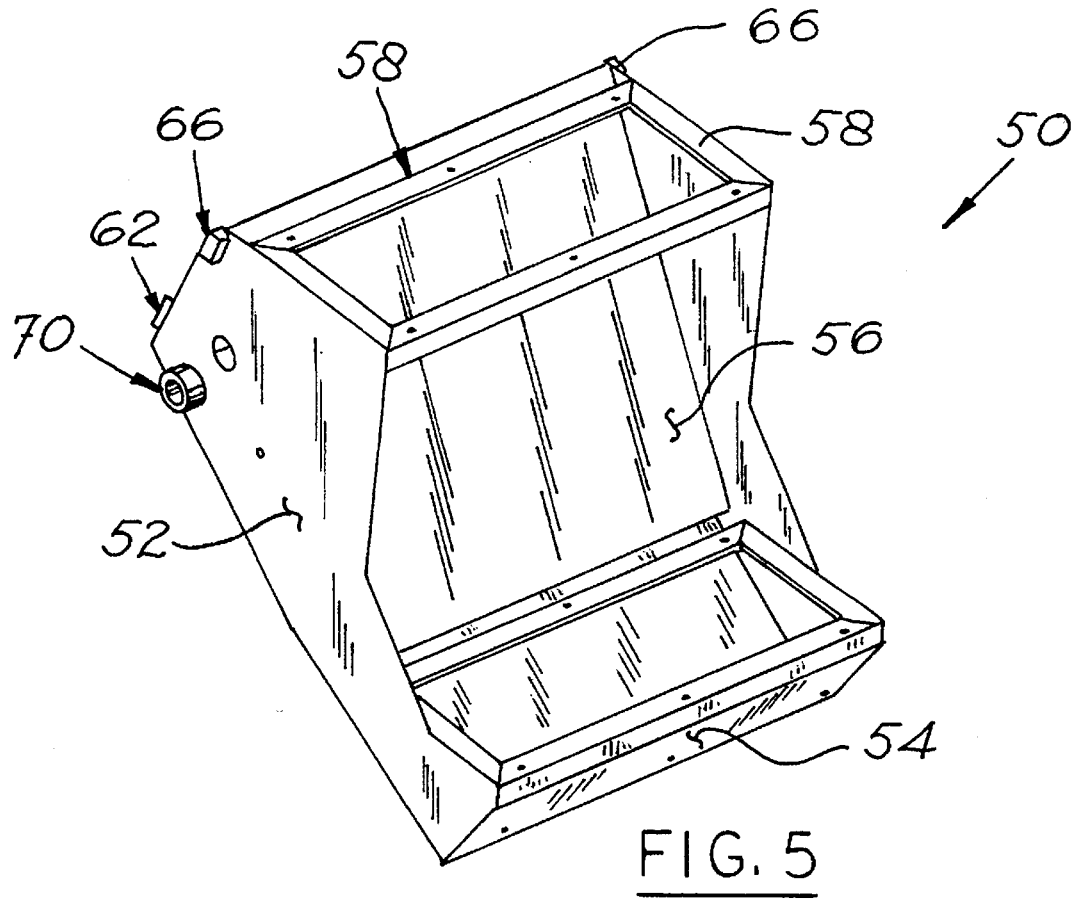
FIG. 5 is a top perspective view of the step structure.

Step structure 50 is shown in FIGS. 1–6. The step structure 50 comprises an aluminum weldment designed to pivot on its axle 70. The step structure 50 includes two (2) side step plates 52, a front step plate 54 and a back or step plate reinforcement 56. The step plate reinforcement 56 also blocks the user's view through the back side of the step structure 50. As shown in FIG. 5, two step plate frames 58 extend between side plates 52. Step plates 60 may include textured surfaces and are attached to the plate frames 58. The step plates 60 are preferably fabricated from a grated material, as shown in FIGS. 1 and 3 so that they are self-draining and do not allow for the formation of ice on their surfaces. They are available in various textures including light, medium, and aggressive depending upon the user's needs.

The step structure 50 further includes a step plate skirt 62 attached on the back side of the structure 50 between the two step side plates 52 as shown in FIG. 5.

As shown in FIG. 2, a mounting hole or aperture 64 is provided for connection of the ram end 96 of the reciprocating air cylinder 90. Step structure 50 also includes a pair of step plate stops 66. As shown in FIG. 2, step plate stops 66 come into contact with the "L" shaped step stop brackets 44 and 46 when the step structure 50 is fully extended to its outer position.

Figure 6:
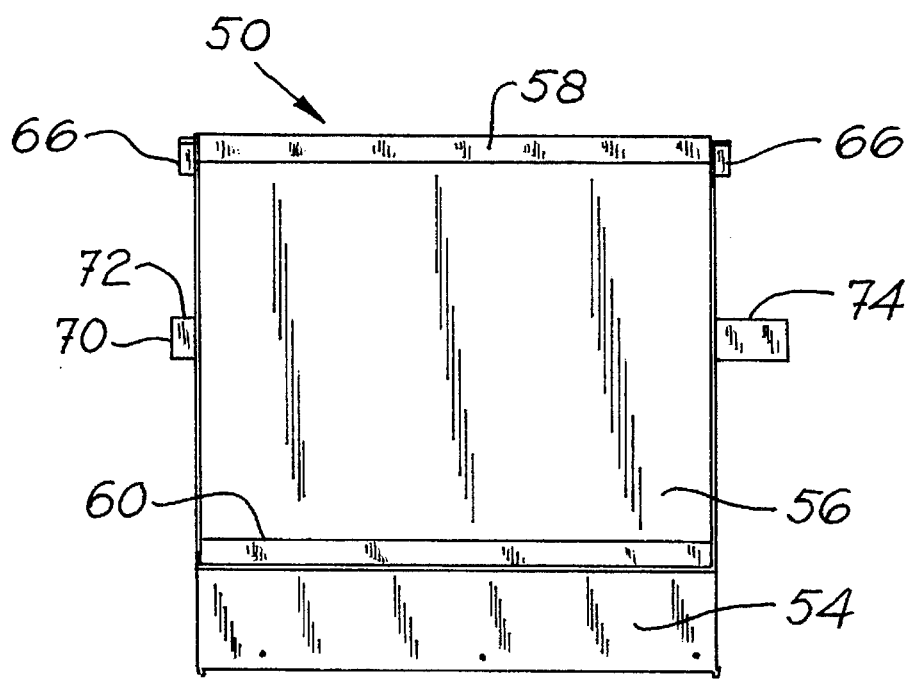
FIG. 6 is a front view of the step structure.
Figure 7:
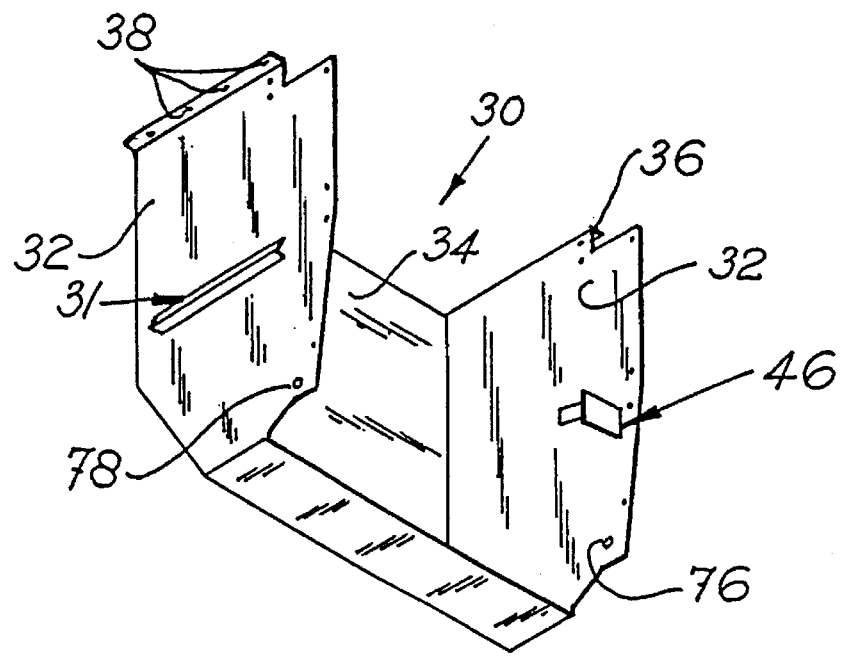
FIG. 7 is a bottom perspective view of the step box.

The step structure axle 70 extends through and is connected to the sides 52 of the step structure 50 as shown in FIGS. 5 and 6. The axle 70 comprises a tube-like member. The axle 70 has ends 72 and 74. The ends 72 and 74 fit into bearing surfaces 76 and 78 respectively, located in step box sides 32 of step box 30. Nylatron® bushings are provided at the axle pivot point for smooth opening and closing of the step structure 50 from and into step box 30.

Reciprocating air cylinder 90, including a ram 92 and cylindrical body 94, holds the step structure 50 within the body of the vehicle 20 and actuates or unfolds the step structure 50 from the step box 30. End 96 of the ram 94 has a cylindrical bushing 95 attached thereto which is connected to the step structure 50 at ram mounting hole 64. The end of the cylindrical body 94 is pivotally connected by bracket 98 to the cylinder mounting block 40 which, as previously discussed, is attached to the corresponding side 32 of the step box 30. In our preferred embodiment, the reciprocating cylinder 90 is a pneumatic cylinder operated by air. However, the preferred pneumatic cylinder 90 could be replaced by any type of mechanism that operates in substantially the same way to produce substantially the same result.

The preferred cylinder 90 is a double actuating cylinder which has two inlet ports including one inlet port 100 located near the end of the cylinder body 94 where bracket 98 is located and the other port 102 is located on the opposite end of the cylinder body 94. Injecting pressurized air into port 100 extends ram 92 and injecting pressurized air into port 102 retracts ram 92.

It should also be noted that our preferred double actuating or reciprocating cylinder 90 could be replaced with a single actuating cylinder and a return spring. The single actuating cylinder would function to move the step structure from its closed position to its unfolded position and to hold the step structure in that position. When the fluid pressure in the cylinder is released, the step structure 50 would be folded up or retracted by the spring which would also extend between the step box 30 and the step structure 50.

Referring to FIGS. 1–4 the position of control valve 112, mounted to the bottom of the vehicle 20 cab floor structure, is shown. The purpose and function of control valve 112 is discussed infra.

At least one controlled fluid source system 110 is also attached to the vehicle 20 and provides fluid to the reciprocating cylinder 90. In our preferred embodiment, the fluid source system 110 comprises a tap 120 into the vehicle's air system, an air tank 122, an air regulator 124, and an auxiliary air compressor 126. Under normal operating conditions, enough air can be provided by the vehicle air system to operate the folding step system 10. The air is tapped from the vehicle air brake system by tap 120 and fed into an air tank 122. An auxiliary air compressor 126 is provided for maintaining enough air pressure in tank 122 for the proper operation of the system 10. In the event that the vehicle's air system should lose pressure, the auxiliary air compressor 126 is capable of providing sufficient air pressure to operate the folding step system 10.

Figure 10:
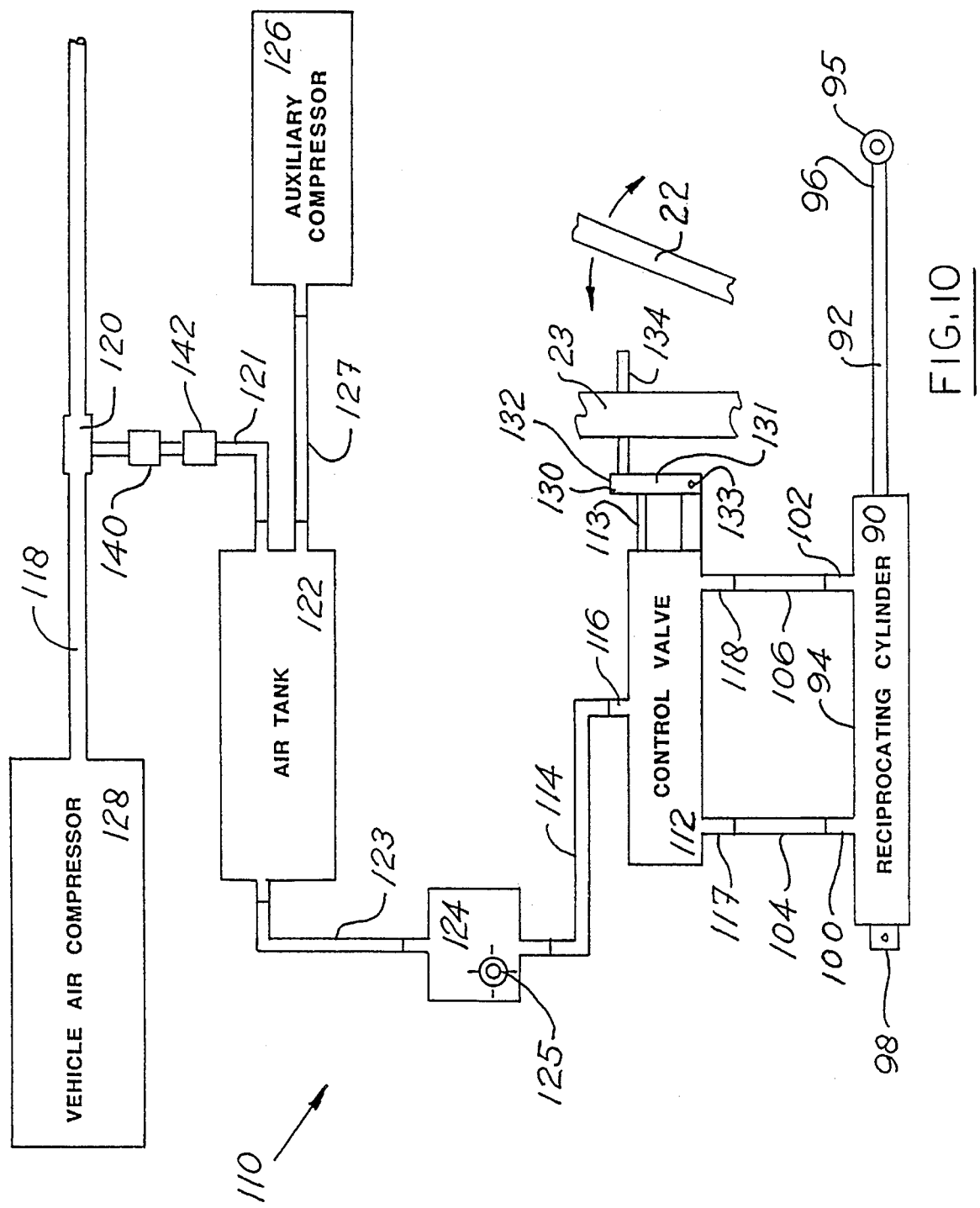
FIG. 10 is a schematic diagram of the fluid source system of the present invention.

The fluid source system 110 of the preferred embodiment is shown schematically in FIG. 10. Tap 120 is coupled into one of the wet tank air lines 118 extending from the vehicle air compressor 128. A pressure protection valve 140 is connected to tap 120 and a check valve 142 is connected to the pressure protection valve 140. The pressure protection valve 140 is designed to comply with NFPA standards so that air or fluid will only pass through the pressure protection valve 140 if the pressure is in excess of 85 p.s.i. This ensures that there is always a set minimum air pressure in the vehicle air system for other operations required of the vehicle air system, e.g., brake operation, running air tools, running extrication equipment, auxiliary air, etc. An air line 121 extends from check valve 142 to air tank 122. The auxiliary compressor 126 has a similar air line 127 that leads from the compressor 126 to the air tank 122. Air stored within the tank 122 exits the tank 122 by way of air line 123 and enters regulator 124. The regulator 124 has an adjustment mechanism shown at 125, for controlling the air pressure that is supplied to a two-way air valve or control valve 112. The pressurized air enters control valve 112 at inlet 116 which is connected to air line 114 as shown in FIG. 10. Control valve 112 has two outlet ports 117 and 118, and a valve pin 113.

Depending upon the position of valve pin 113, the compressed air exits control valve 112 at outlet port 117 or outlet port 118. Control valve outlet port 117 is connected to inlet port 100 of the reciprocating cylinder 90 by air line 104 and control valve outlet port 118 is connected to inlet port 102 of the reciprocating cylinder 90 by air line 106.

As shown in FIG. 10, a paddle 130 is pivotally connected at point 133 to control valve 112. The mid-section 131 of the paddle 130 contacts valve pin 113 and the paddle end 132 contacts a door plunger 134. Valve pin 113 is biased, typically by a spring, in an outward direction. When the vehicle door 22 or 24 is closed, it contacts door plunger 134 which in turn contacts paddle 130. Door plunger 134 is supported by and located in the lower portion of the vehicle's door frame 23. When the vehicle door 22 or 24 is closed, the valve pin 113 is moved to an inner position which causes control valve 112 to release the pressurized air at port 117 and to supply pressurized air to port 118 which will retract cylinder ram 92 into cylinder body 94. By releasing the pressurized air at port 100 and supplying pressurized air at port 102, the step structure 50 folds up or retracts within the step box 30. When the door 22 or 24 is opened and door plunger 134 no longer holds valve pin 113 in the inner position and valve pin 113 is biased outward by its valve spring, pressurized air is then supplied to inlet port 100 which extends cylinder ram 92. This causes step structure 50 to be extended into a position for egress from and ingress to the vehicle 20.

Thus as a vehicle occupant prepares to egress from the vehicle 20, he or she simply opens door 22 or 24 which allows door plunger 134 to extend outward from the door frame 23. Control valve 112 then instantly provides pressurized air to the reciprocating cylinder 90 and ram 92 extends the step structure 50 from the step box. The cycle time is such that the step structure 50 is fully extended before the occupant has fully opened the door 22 or 24. There is no need for the occupant to wait for the step structure 50 to fully extend before egressing from the vehicle 20. When the vehicle door 22 or 24 is closed, regardless of whether the occupant has re-entered the vehicle 20, the step structure 50 folds back into the step box 30. When the door 22 or 24 is again opened, the step structure 50 is again extended from step box 30.

The above described embodiments of this invention are merely descriptive of its principles and are not to be limited. The scope of this invention instead shall be determined from the scope of the following claims, including their equivalents.

What is claimed is:

1. A folding step system for a vehicle having a chassis and at least one door, the system comprising:

a step box mechanism attached to the vehicle chassis beneath the door, the step box mechanism having a generally open front and a pair of side walls;

a bearing surface formed in each side wall;

a step structure having at least one step and an axle, the step structure positioned within the step box and the axle rotatably supported by the bearing surfaces;

a fluid filled reciprocating cylinder having a body and a ram structure, the fluid filled reciprocating cylinder being located within the step box mechanism and the body being connected to the step box and the ram structure being connected to the step structure;

a controlled fluid source for providing fluid to the reciprocating cylinder, the controlled fluid source connected to the reciprocating cylinder and further including a control valve having a control valve pin, the control valve pin being actuated by the opening and closing of the vehicle door.

2. The folding step system of claim 1 wherein the controlled fluid source comprises:

a vehicle air compressor, an auxiliary air compressor, an air tank, an air regulator, and a control valve;

a first air line connecting the vehicle air compressor to the air tank, a second air line connecting the auxiliary air compressor to the tank, and a third air line connecting the tank to the regulator;

a fourth air line connecting the regulator to the control valve, the control valve having a first and a second outlet port;

a fifth air line connecting the first outlet port to the reciprocating cylinder and a sixth air line connecting the second outlet port to the reciprocating cylinder.

3. The folding step system of claim 1 further including at least one upper step stop, the upper step stop being attached to at least one step box side wall.

4. The folding step system of claim 1 further including at least one lower step stop and at least one lower step stop bracket, the lower step stop being attached to the step structure and the lower step stop bracket being attached to one step box side wall.

5. The folding step system of claim 1 wherein the fluid filled reciprocating cylinder body is connected to one step box side wall.

6. A folding step system for a vehicle having a chassis and at least one door, the step system comprising:

a step box having two sides, a back, a mounting flange, and a generally open front;

the mounting flange rigidly connected to the vehicle chassis;

an axle receiving aperture formed in each step box side;

a step structure having two side walls, an axle, and at least one step;

the step connected to and extending between the side walls;

the axle having two ends, each end passing through one of the side walls;

the step structure positioned within the step box and each axle end pivotally located within one of the axle receiving apertures;

a reciprocating fluid filled cylinder having a body end and a ram end;

the body end connected to one of the step box side walls and the ram end connected to one of the step structure side walls;

a controlled fluid source for extending and retracting the ram end connected to the reciprocating fluid filled cylinder.

7. The folding step structure of claim 6 further including a door plunger slidably engaged within a door frame of the vehicle and the controlled fluid source further including a valve;

the plunger having two ends, the first end contacting the vehicle door and the second end contacting the valve.

8. The folding step system of claim 6 further including at least one upper step stop, the upper step stop being attached to at least one step box side.

9. The folding step system of claim 6 further including at least one lower step stop and at least one lower step stop bracket, the lower step stop being attached to at least one step structure side wall and the lower step stop bracket being attached to at least one step box side.

* * * * *